US011431424B2

United States Patent
Hsieh et al.

(10) Patent No.: US 11,431,424 B2
(45) Date of Patent: Aug. 30, 2022

(54) SOFTWARE-DEFINED CONFIGURABLE CLOUD-BASED RF TEST DEVICE AND METHOD THEREOF

(71) Applicant: Quanta Computer Inc., Taoyuan (TW)

(72) Inventors: Tsung-Ying Hsieh, Taoyuan (TW); Chi-Hsuan Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 56 days.

(21) Appl. No.: 16/943,395

(22) Filed: Jul. 30, 2020

(65) Prior Publication Data
US 2021/0258086 A1 Aug. 19, 2021

(30) Foreign Application Priority Data

Feb. 18, 2020 (TW) .................................. 109105064

(51) Int. Cl.
| | | |
|---|---|---|
| H04B 17/15 | (2015.01) | |
| H04B 17/29 | (2015.01) | |
| H04W 24/06 | (2009.01) | |
| H04W 24/08 | (2009.01) | |

(52) U.S. Cl.
CPC ............ *H04B 17/15* (2015.01); *H04B 17/29* (2015.01); *H04W 24/06* (2013.01); *H04W 24/08* (2013.01)

(58) Field of Classification Search
CPC ....... H04B 17/15; H04B 17/29; H04W 24/06; H04W 24/08
See application file for complete search history.

(56) References Cited

U.S. PATENT DOCUMENTS

| | | | | |
|---|---|---|---|---|
| 9,794,009 B1 * | 10/2017 | Olgaard | ............... | H04B 17/318 |
| 9,941,983 B1 * | 4/2018 | Seebacher | .......... | H04B 17/0085 |
| 10,097,282 B1 * | 10/2018 | Chao | ...................... | H04B 17/27 |
| 10,181,915 B1 * | 1/2019 | Slamani | ................. | H04B 17/29 |
| 10,462,456 B2 * | 10/2019 | Tiwari | .................. | H04N 17/04 |

(Continued)

FOREIGN PATENT DOCUMENTS

CN 110690929 A 1/2020

OTHER PUBLICATIONS

Chinese language office action dated Oct. 30, 2020, issued in application No. TW 109105064.
(Continued)

*Primary Examiner* — Dominic E Rego
(74) *Attorney, Agent, or Firm* — McClure, Qualey & Rodack, LLP

(57) ABSTRACT

A test device suitable for a predetermined wireless communication protocol includes a remote RF test box and a cloud server. The remote RF test box used to control a DUT to transmit or receive an RF signal includes an RF processing unit and a low-level processor. The RF processing unit receives the RF signal from the DUT, and down-converts the RF signal from the DUT into a baseband signal. The low-level processor converts the baseband signal into a digital signal. The cloud server stores an algorithm corresponding to the predetermined wireless communication protocol, communicates with the remote RF test box through a communication interface, receives and decodes the digital signal, and determines whether the DUT meets the predetermined wireless communication protocol through the algorithm of the predetermined wireless communication protocol.

6 Claims, 3 Drawing Sheets

(56) References Cited

U.S. PATENT DOCUMENTS

| | | | | |
|---|---|---|---|---|
| 10,992,393 B1* | 4/2021 | Gallhauser | ......... | H04B 17/0085 |
| 11,264,906 B2* | 3/2022 | McQuilkin | ......... | H02M 3/1584 |
| 2009/0192738 A1* | 7/2009 | Nentwig | ............... | H03F 1/3241 |
| | | | | 702/66 |
| 2010/0037111 A1* | 2/2010 | Ziaja | ....................... | G06F 11/24 |
| | | | | 714/744 |
| 2012/0207030 A1 | 8/2012 | Luong | | |
| 2013/0049786 A1* | 2/2013 | El-Hassan | ............ | H04B 17/309 |
| | | | | 324/756.01 |
| 2013/0266051 A1* | 10/2013 | Yang | .................. | H04B 17/0085 |
| | | | | 375/224 |
| 2013/0266052 A1* | 10/2013 | Yang | ...................... | H04B 17/29 |
| | | | | 375/224 |
| 2016/0204881 A1* | 7/2016 | Chung | ............... | G01R 31/2822 |
| | | | | 455/67.14 |
| 2016/0294668 A1 | 10/2016 | Fuessel | | |
| 2018/0034560 A1* | 2/2018 | Foegelle | ............ | H04B 17/0085 |
| 2018/0080968 A1* | 3/2018 | Qi | ........................... | H04B 17/29 |
| 2019/0068296 A1* | 2/2019 | Rowell | ................. | H04B 17/101 |
| 2019/0143679 A1* | 5/2019 | Gracia Verdugo | ......... | B41J 2/12 |
| | | | | 347/19 |
| 2019/0246345 A1* | 8/2019 | Murthy | .............. | H04B 17/0085 |
| 2019/0260482 A1* | 8/2019 | Sterzbach | ............... | H04B 17/15 |
| 2019/0363806 A1* | 11/2019 | Glover | ................... | H04B 17/15 |
| 2020/0080873 A1* | 3/2020 | Jackson | .............. | G06F 16/2255 |
| 2021/0184579 A1* | 6/2021 | McQuilkin | ...... | G01R 31/31926 |

OTHER PUBLICATIONS

Chinese language office action dated May 6, 2022, issued in application No. TW 109105064.

\* cited by examiner

SOFTWARE-DEFINED CONFIGURABLE CLOUD-BASED RF TEST DEVICE AND METHOD THEREOF

CROSS REFERENCE TO RELATED APPLICATIONS

This application claims priority to and the benefit of Taiwan Application No. 109105064, filed on Feb. 18, 2020, the entirety of which is incorporated by reference herein.

FIELD OF THE INVENTION

The invention relates to an RF (Radio Frequency) test device, especially one relating to a software-defined configurable cloud-based RF test device.

DESCRIPTION OF THE RELATED ART

With the development of science and technology and the evolution of radio frequency technology, recent wireless products have operated under more and more radio frequency specifications and frequency bands. In this case, traditional RF test methods have been unable to meet the test requirements of product designers and factory-side production line testers. Traditional RF test methods have the following three obvious shortcomings: 1) Price: Traditional RF test equipment is expensive and is easily rendered obsolete due to the evolution of new RF technologies. 2) Flexibility: Traditional RF test equipment generates, determines, and calculates test patterns in its own equipment, such architecture makes the test time longer, and the test equipment cannot effectively and quickly update test items and specifications. 3) Resource efficiency: Due to the lack of flexibility in traditional RF test architectures, the test equipment must include as many test items as possible with test requirements. However, many of these test items have a very low probability of being used. When the required computing resources and capabilities are not high, the computing resources and capabilities of the test equipment are not maximized.

BRIEF SUMMARY OF THE INVENTION

In order to resolve the issue described above, an embodiment of the invention provides a test device suitable for a predetermined wireless communication protocol, including a remote RF test box and a cloud server. The remote RF test box used to control a device under test (DUT) to transmit or receive an RF signal includes: an RF processing unit and a low-level processor. The RF processing unit receives the RF signal transmitted from the DUT, and down-converts the RF signal transmitted from the DUT into a baseband signal, or up-converts the baseband signal into an RF signal, and transmits the RF signal to the DUT. The low-level processor converts the baseband signal into a digital signal, or receives the digital signal and converts the digital signal into a baseband signal. The cloud server stores an algorithm corresponding to the predetermined wireless communication protocol, communicates with the remote RF test box through a communication interface, receives and decodes the digital signal, and determines whether the DUT meets the predetermined wireless communication protocol through the algorithm of the predetermined wireless communication protocol.

According to the test device disclosed above, wherein the RF processing unit includes an RF front-end and an RF transceiver. The RF front-end receives the RF signal transmitted from the DUT, or transmits the RF signal to the DUT. The RF transceiver down-converts the RF signal transmitted from the DUT into a baseband signal, or up-converts the baseband signal into an RF signal.

According to the test device disclosed above, when the DUT is under a TX test, the RF front-end receives the RF signal transmitted from the DUT, the RF transceiver down-converts the RF signal into a baseband signal, and the low-level processer converts the baseband signal into a digital signal and outputs it to the cloud server. When the DUT is under a RX test, the RF front-end transmits the RF signal to the DUT, the low-level processor receives a bit-error rate (BER) retrieved by demodulating the RF signal by the DUT through a control signal line, and outputs the signal error rate to the cloud server.

According to the test device disclosed above, wherein the cloud server includes a storage device and a high-level processor. The storage device stores the algorithm corresponding to the predetermined wireless communication protocol, wherein the algorithm of the predetermined wireless communication protocol includes test patterns of the predetermined wireless communication protocol. The high-level processor decodes the digital signal and determines whether the DUT meets the predetermined wireless communication protocol through the test patterns of the predetermined wireless communication protocol. The cloud server further includes a network unit, the test patterns of the other wireless communication protocol except the predetermined wireless communication protocol may be input to the storage device of the cloud server through the network unit; test specifications and test items can be instantly changed and updated; and a test result of the DUT may be output, or the test patterns of the predetermined wireless communication protocol may be output through the network unit.

According to the test device disclosed above, further includes a plurality of remote RF test boxes, the plurality of remote RF test boxes couple to a plurality of DUTs to control the plurality of DUTs to transmit or receive RF signals to or from the plurality of remote RF test boxes; wherein the plurality of remote test boxes communicate with the cloud server through the communication interface. Through the Internet, test data related to the plurality of DUTs stored in the cloud server are read, and an algorithm of a new wireless communication protocol is written into the cloud server, so that the cloud server calculates and determines whether the plurality of DUTs meet the new wireless communication protocol.

The present disclosure further discloses a test method suitable for a predetermined wireless communication protocol, the test method is performed by a remote RF test box and a cloud server, and the test method includes a TX (transmitting) test which includes: controlling a DUT to transmit an RF signal; when the DUT transmits the RF signal, receiving the RF signal transmitted from the DUT, down-converting the RF signal into a baseband signal, converting the baseband signal into a digital signal, and then outputting the digital signal; receiving and decoding the digital signal; and determining whether the DUT meets the predetermined wireless communication protocol through an algorithm of the predetermined wireless communication protocol. The test method further includes a RX (receiving) test which includes: generating the digital signal of a test signal by the cloud server; receiving the digital signal, and converting the digital signal into a baseband signal; up-converting the baseband signal into an RF signal; controlling the DUT to receive the RF signal, and the RF signal is demodulated by the DUT.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration.

Figure 1:
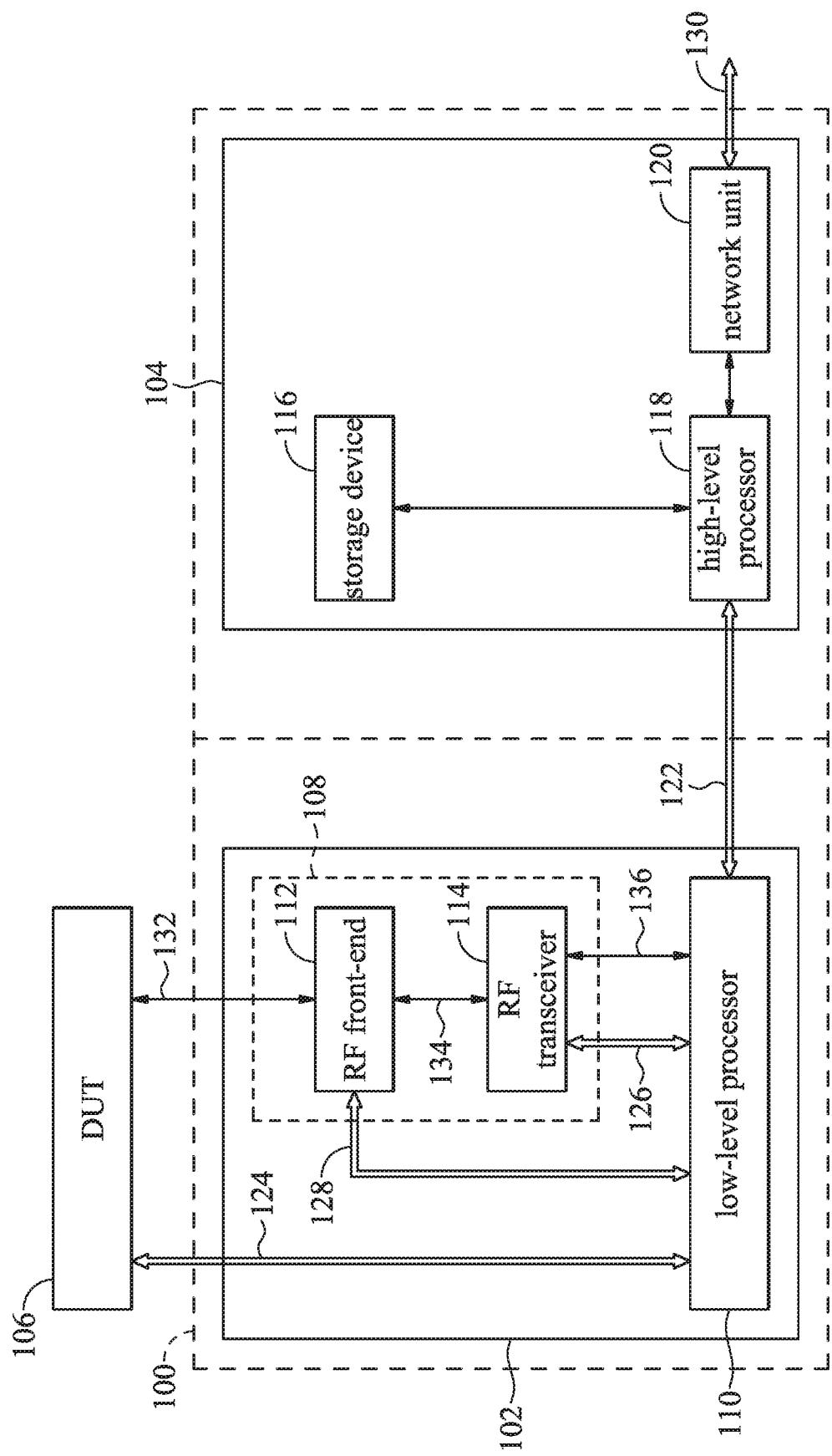
FIG. 1 shows a block diagram of a test device 100 in accordance with some embodiments of a disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE INVENTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

FIG. 1 shows a block diagram of a test device 100 in accordance with some embodiments of a disclosure. As shown in FIG. 1, the test device 100 is a test device suitable for a predetermined wireless communication protocol. Test device 100 includes a remote RF test box 102 and a cloud server 104. The remote RF test box 102 communicates with the cloud server 104 through a communication interface 122. The remote RF test box 102 controls a device under test (DUT) 106 to transmit (TX) or receive (RX) an RF signal 132, through a control signal line 124. The remote RF test box 102 includes an RF processing unit 108 and a low-level processor 110. In detailed, when the DUT 106 is controlled to transmit, the RF processing unit 108 receives the RF signal 132 transmitted from the DUT 106, and down-converts the RF signal 132 transmitted from the DUT 106 into a baseband signal 136. Then, the low-level processor 110 converts the baseband signal 136 into a digital signal, and outputs the digital signal to the cloud server 104 through the communication interface 122. The digital signal may include test patterns of the predetermined wireless communication protocol.

In some embodiments, the communication interface 122 may include an Ethernet, a fiber, an Universal Serial Bus (USB), a Peripheral Component Interconnect Express (PCIe), a Common Public Radio Interface (CPRI), and an Enhance Common Public Radio Interface (eCPRI). In some embodiments, the control signal line 124 may be an USB line.

When the DUT 106 is controlled to receive, the low-level processor 110 receives the digital signal from the cloud server 104 through the communication interface 122, wherein the digital signal includes data to be transmitted to the DUT 106. Next, the low-level processor 110 converts the digital signal into a baseband signal 136. The RF processing unit 108 up-converts the baseband signal 136 into an RF signal 132, and transmits the RF signal 132 to the DUT 106. Generally, the RF processing unit 108 includes an RF front-end 112 and an RF transceiver 114. The RF front-end 112 receives the RF signal 132 transmitted from the DUT 106, or transmits the RF signal 132 to the DUT 106. In some embodiments, the RF front-end 112 generally includes a RX/TX switch, a low noise amplifier (LNA), a filter (such as a SAW filter), a phase-locked loop (PLL), a mixer, a power amplifier, a low-dropout regulator (LDO) and other components. In some embodiments, the low-level processor 110 includes an analog-to-digital convertor (ADC) to convert the baseband signal 136 into a digital signal (such as digital I/Q). The low-level processor 110 further includes a digital-to-analog converter (DAC) to convert the digital signal from the cloud server 104 into a baseband signal 136.

For example, the RX/TX switch controls the RF front-end 112 to perform the function of receiving or transmitting the RF signal 132. The LNA amplifies the RF signal 132 received from the DUT 106, and at the same time to generate as low noise and distortion as possible. The filter filters out noise coupled in the RF signal 132 during transmission. The mixer is matched with the PLL and a local oscillator (LO) to down-convert the received RF signal 132 into an RF signal 134. In some embodiments, the mixer may directly down-converts the RF signal 132 into an intermediate frequency (IF) signal. The LDO adjusts a voltage to an operating voltage of the power amplifier, so that the power amplifier is able to transmit. The power amplifier amplifies the signal to be transmitted to the DUT 106 to become an RF signal 132, and the RF signal 132 is transmitted to the DUT 106 via an antenna or a RF test transmission line (either wired or wireless testing). The components included in the above-mentioned RF front-end 112 are merely examples, and are not intended to limit the present disclosure. The RF transceiver 114 down-converts the RF signal 134 processed by the RF front-end 112 (for example, filtering or down-converting) into a baseband signal 136, or up-converts the baseband signal 136 into an RF signal 134, and then the RF signal 134 is up-converted so that it may serve as an RF signal 132 by the RF front-end 112. The low-level processor 110 controls the RF transceiver 114 and the RF front-end 112 to receive or transmit through control signal lines 126 and 128.

In some embodiments, when the DUT 106 is under an RX test, the low-level processor 110 of the remote RF test box 102 receives commands from the cloud server 104 through the communication interface 122, the low-level processor 110 respectively sets the RF transceiver 114 and the RF front-end 112 as a TX mode, through the control signal lines 126 and 128, and loads the data to be transmitted to the DUT 106 in the baseband signal 136. The baseband signal 136 is up-converted by the RF transceiver 114 and up-converted by the RF front-end and amplified to become an RF signal 132, and the RF signal 132 is transmitted to the DUT 106 via the antenna of the remote RF test box 102 or the RF test transmission line. After the DUT 106 receives the RF signal 132 transmitted from the remote RF test box 102, the receiving components of the DUT 106 down-convert, demodulate, and decode the RF signal 132 to become a digital signal. The low-level processor 110 receives the digital signal retrieved by demodulating and decoding the RF signal 132 by the DUT 106 through the control signal line 124, and outputs the digital signal to the cloud server 104. In some embodiments, after the DUT 106 receives the RF signal 132 transmitted from the remote RF test box 102, the receiving components of the DUT 106 may calculate receiving sensitivity for the received RF signal 132, and may output to the low-level processor 110 of the remote RF test box 102 through the control signal line 124, and the low-level processor 110 sends the receiving sensitivity information to the cloud server 104 through the communication interface 122. The cloud server 104 may determine whether the DUT 106 meets the standard of the wireless communication protocol according to a sensitivity standard of the wireless communication protocol stored in the cloud server 104.

In some embodiments, when the DUT 106 is under a TX test, the low-level processor 110 of the remote RF test box 102 instructs the DUT 106 through the control signal line 124 to transmit. When the RF front-end 112 of the remote RF test box 102 receives the RF signal 132 transmitted from the DUT 106, the RF front-end 112 filters and amplifies the received RF signal 132 (such as through the LNA), and down-converts the RF signal 132 to become an RF signal 134. Next, the RF transceiver 114 again down-converts the RF signal 134 into a baseband signal 136 (such as an analogue IQ signal). The low-level processor 110 then converts the baseband signal 136 into a digital signal, and outputs the digital signal to the cloud server 104 through the communication interface 122. In some embodiments, the RF transceiver 114 in the RF processing unit 108 may calculate a TX power of the received RF signal 132, and load the TX power information on the baseband signal 136. The cloud server 104 compares the TX power information in the digital signal after decoding with the TX power standard specified by the wireless communication protocol to determine whether the DUT 106 meets the wireless communication protocol.

As shown in FIG. 1, in some embodiments, the cloud server 104 includes a storage device 116, a high-level processor 118 and a network unit 120. The storage device 116 stores an algorithm corresponding to a predetermined wireless communication protocol, and the algorithm of the predetermined wireless communication protocol includes test patterns of the predetermined wireless communication protocol, such as a TX power standard, a receiving sensitivity standard, and a transmission bandwidth standard of the predetermined wireless communication protocol. The high-level processor 118 decodes the digital signal, and determines whether the DUT 106 meets the predetermined wireless communication protocol through test patterns of the predetermined wireless communication protocol stored in the storage device 116. Testers or R&D personnel can input an algorithm of other wireless communication protocols except the predetermined wireless communication protocol into the storage device 116 of the cloud server 104 through the network unit 120 of the cloud server 104 and the Internet 130, and can output a test result of the DUT 106 through the network unit 120, or output test patterns of the predetermined wireless communication protocol. When the DUT 106 does not meet the predetermined wireless communication protocol, for example, the TX power of the DUT 106 does not meet the standard of the predetermined wireless communication protocol, R&D personnel can adjust the TX power of the DUT 106 according to test results. In some embodiments, the computing performance of the high-level processor 118 is greater than that of the low-level processor 110.

In some embodiments, the predetermined wireless communication protocol includes: Bluetooth, Wi-Fi, GPS, FM, ZigBee, mobile network 2G, 3G, 4G and 5G, and IoT transmission technologies such as SigFox, Ingenu and LoRa. Since operation frequency and operation bandwidth of each wireless communication protocol are different, in practice, the RF front-end 112 and the RF transceiver 114 in the RF processing unit 108 need to make different setting according to the predetermined wireless communication protocol to test the DUT 106. For example, when test device 100 is used to test the function of GPS and Wi-Fi on the DUT 106, since the operation frequency of GPS is 1575.42 MHz, and the operation frequency of Wi-Fi is 2.4 GHz or 5 GHz, it is necessary to design two circuits in the RF front-end 112. One circuit includes a first local oscillator (LO), a PLL, and a mixer. The GPS signal is down-converted by subtracting the GPS signal frequency by the first LO signal frequency through the mixer. The other circuit includes a second LO, the PLL, and the mixer. The Wi-Fi signal is down-converted by subtracting the Wi-Fi signal frequency by the second LO signal frequency through the mixer. In other words, the RF front-end 112 can switch between different local oscillators according to predetermined wireless communication protocol currently being tested. For example, when GPS is being tested, the RF front-end 112 switches to the first LO, and when Wi-Fi is being tested, the RF front-end 112 switches to the second LO to achieve the purpose of down-converting different RF signals.

In some embodiments, it is necessary to select an RF transceiver that supports the predetermined wireless communication protocol as the RF transceiver 114 according to types of the predetermined wireless communication protocol for testing the DUT 106. For example, when the test device 100 is used to test the function of GPS and Wi-Fi on the DUT 106, it is necessary to select the RF transceiver 114 that supports the RX/TX function of GPS and Wi-Fi in the remote RF test box 102 to down-convert the RF signal transmitted from the DUT 106 into the corresponding baseband signal. In some embodiments, when the test device 100 is used to test the function of GPS and Wi-Fi on the DUT 106, the storage device 116 of the cloud server 104 needs to store algorithms corresponding to GPS and Wi-Fi at the same time, and includes test patterns of GPS and Wi-Fi, so that the high-level processor 118 can determine whether the test data of the DUT 106 meets the test specifications specified by GPS and Wi-Fi according to the test patterns.

For example, the DUT 106 needs to test total 10 test items in a wireless communication test, wherein the $1^{st}$ to $5^{th}$ test items are for GPS testing, the $6^{th}$ to $10^{th}$ test items are for Wi-Fi testing. During the test, when the DUT 106 is about to test the test items $1^{st}$ to $5^{th}$, the cloud server 104 will be set to read the algorithm corresponding to GPS in its storage device 116 to determine whether the DUT 106 meets GPS test specifications. When the DUT 106 is about to test the test items $6^{th}$ to $10^{th}$, the cloud server 104 will be set to read the algorithm corresponding to Wi-Fi in its storage device 116 to determine whether the DUT 106 meets Wi-Fi test specifications.

Figure 2:
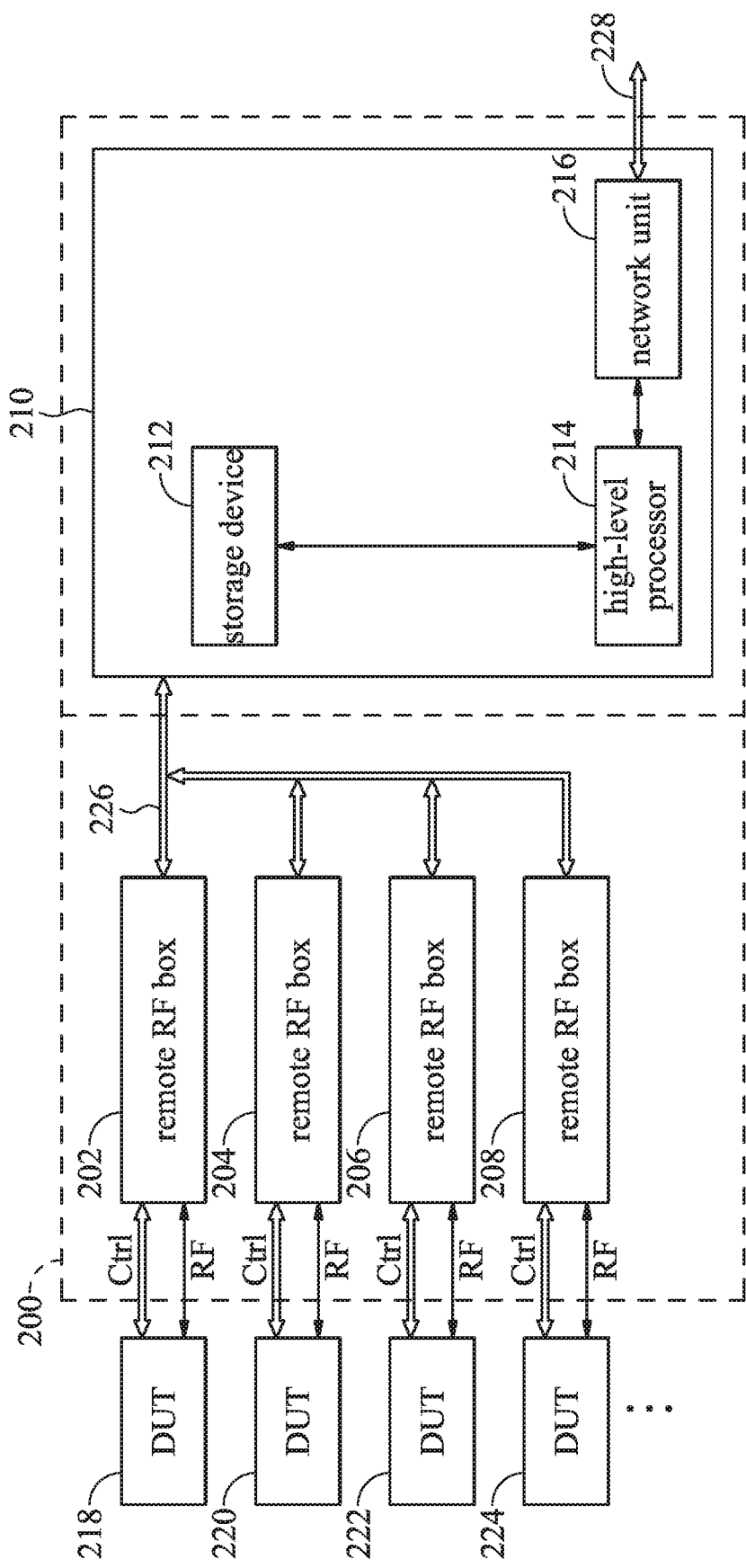
FIG. 2 shows a block diagram of a test device 200 in accordance with some embodiments of the disclosure.

FIG. 2 shows a block diagram of a test device 200 in accordance with some embodiments of the disclosure. The test device 200 includes a plurality of remote RF test boxes (such as remote RF test boxes 202, 204, 206, 208 . . . ) and a cloud server 210. The plurality of remote RF test boxes communicate with the cloud server 210 through a communication interface 226. In detailed, the remote RF test box 202 communicates with a DUT 218 through a control signal line Ctrl, the remote RF test box 204 communicates with a DUT 220 through a control signal line Ctrl, the remote RF test box 206 communicates with a DUT 222 through a control signal line Ctrl, and the remote RF test box 208 communicates with a DUT 224 through a control signal line Ctrl. The remote RF test box 202 receives or transmits an RF signal to the DUT 218 in a wired or wireless manner. Similarly, The remote RF test box 204 receives or transmits an RF signal to the DUT 220 in the wired or wireless manner, the remote RF test box 206 receives or transmits an RF signal to the DUT 222 in the wired or wireless manner, and the remote RF test box 208 receives or transmits an RF signal to the DUT 224 in the wired or wireless manner. The above wireless transmission manner can be done via Bluetooth, Wi-Fi, GPS, FM, ZigBee, mobile network 2G, 3G, 4G and 5G, and IoT transmission technologies such as SigFox, Ingenu and LoRa, and other communication protocols. The operation and test methods of each of the plurality of remote RF test boxes and their corresponding DUTs are the same as those of the remote RF test box 102 and the DUT 106 in FIG. 1, so they are no longer to repeat herein.

It should be noted that the plurality of remote RF test boxes (such as remote RF test boxes 202, 204, 206, 208 . . . ) can respectively control a plurality of DUTs (such as DUTs 218, 220, 222, 224) to simultaneously transmit or receive the RF signal, and the plurality of remote RF test boxes communicate with the cloud server 210 through the communication interface 226 to meet the requirements of the actual production line test. In other words, the remote RF test box 202 can be arranged on a first production line, the remote RF test box 204 can be arranged on a second production line, and the remote RF test box 206 can be arranged on a third production line to simultaneously test the plurality of DUTs (such as DUTs 218, 220, 222) by the predetermined wireless communication protocol, thereby increasing the test efficiency of the entire production lines and shortening the overall test time. In some embodiments, different test stations on the same production line can be connected through a remote server to simultaneously test different test items.

In addition, testers or R&D personnel can read the test data related to the plurality of DUTs stored in the cloud server 210 through Internet 228, and write an algorithm of the new wireless communication protocol into the cloud server 210, so that the cloud server 210 is able to calculate and determine whether the plurality of DUTs meet the new wireless communication protocol. The configuration of the cloud server 210 in FIG. 2 is the same as that of the cloud server 104 in FIG. 1. The cloud server 210 includes a storage device 212, a high-level processor 214, and a network unit 216. The storage device 212 can correspond to the storage device 116 in FIG. 1, the high-level processor 214 can correspond to the high-level processor 118, and the network unit 216 can correspond to the network unit 120.

Figure 3:
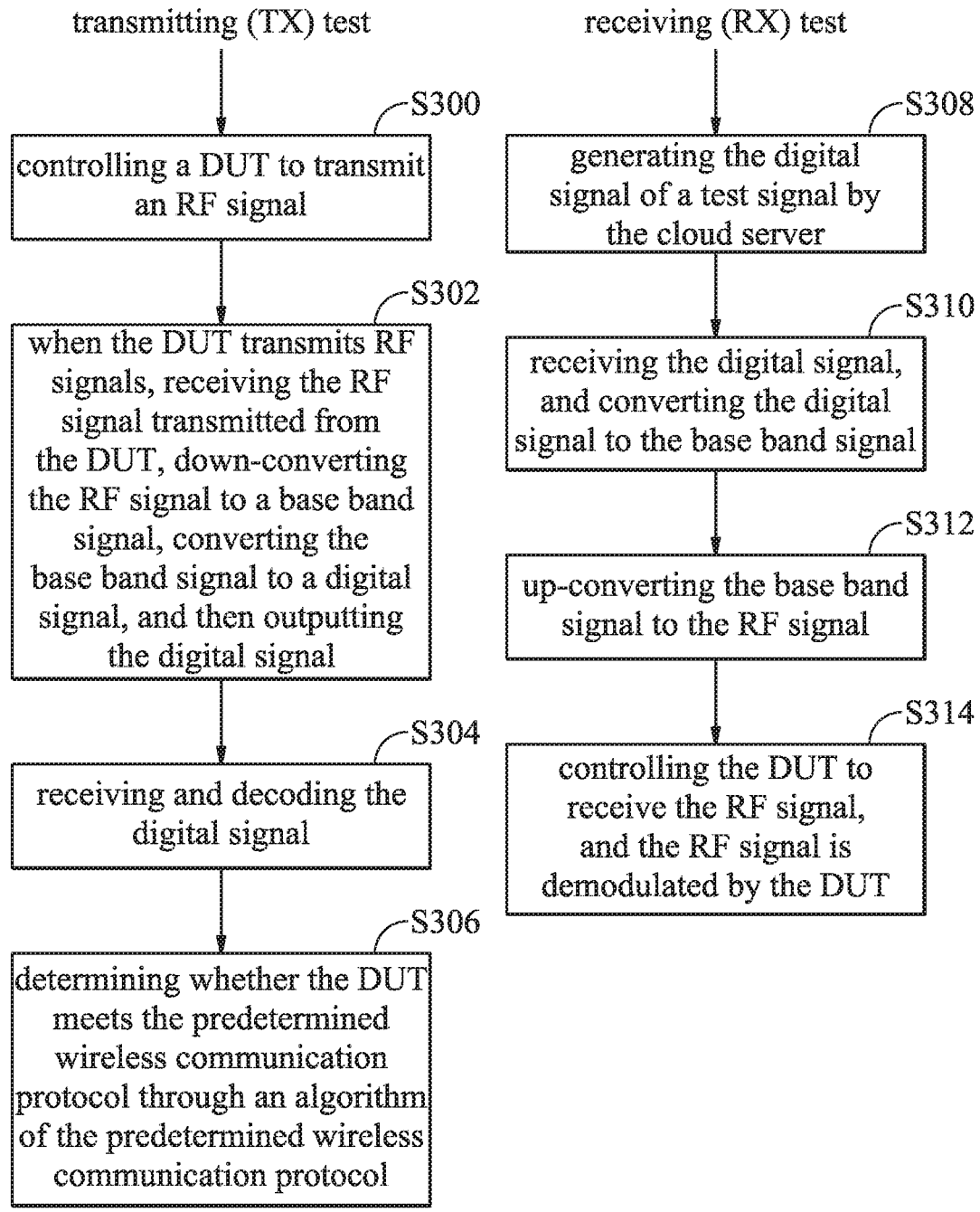
FIG. 3 shows a flow chart of a test method in accordance with some embodiments of the disclosure.

FIG. 3 shows a flow chart of a test method in accordance with some embodiments of the disclosure. As shown in FIG. 3, the present disclosure also discloses a test method suitable for a predetermined wireless communication protocol performed by a remote RF test box and a cloud server, the test method comprising a TX test which comprises: controlling a DUT to transmit an RF signal (step S300); when the DUT transmits, receiving the RF signal transmitted from the DUT, down-converting the RF signal into a baseband signal, converting the baseband signal into a digital signal, and then outputting the digital signal (step S302); receiving and decoding the digital signal (step S304); and determining whether the DUT meets the predetermined wireless communication protocol through an algorithm of the predetermined wireless communication protocol (step S306). In some embodiments, the low-level processor 110 in the remote RF test box 102 in FIG. 1 executes step S300 according to the command from the cloud server 104. The RF processing unit 108 and the low-level processor 110 in FIG. 1 cooperate to execute step 302, wherein the RF processing unit 108 executes "receiving the RF signal transmitted from the DUT, down-converting the RF signal into a baseband signal" in step S302, and the low-level processor 110 executes "converting the baseband signal into a digital signal, and then outputting the digital signal" in step S302. The high-level processor 118 of the cloud server 104 in FIG. 1 executes steps S304 and S306.

The test method of the present disclosure further includes a RX test which comprises: generating the digital signal of a test signal by the cloud server (step S308); receiving the digital signal, and converting the digital signal into a baseband signal (step S310); up-converting the baseband signal into an RF signal (step S312); and controlling the DUT to receive the RF signal, and the RF signal is demodulated by the DUT (step S314). In some embodiments, the RF processing unit 108 in FIG. 1 executes step S312, and the low-level processor 110 in FIG. 1 executes step S310. It should be noted that steps S300 and S314 in FIG. 3 are independent of each other, and are used to test whether the transmitting capability and receiving capability of the DUT under the predetermined wireless communication protocol meet the standard of the predetermined wireless communication protocol.

The present disclosure provides a new test device and the test method thereof. Under the cloud and software programmable architecture, the new test device and its test method have the following special advantages: 1) the cost is extremely low; 2) the test items can be dynamically adjusted (that is, different wireless communication protocols, no matter they are current or future RF test specifications); 3) the test efficiency of the production line is high; 4) it can meet the test requirements for rapid deployment of mass production lines; and 5) it is not necessary to frequently purchase traditional RF test equipment. Therefore, the present disclosure significantly improves the shortcomings of the traditional RF test equipment.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A test device suitable for a predetermined wireless communication protocol, comprising:
   a remote RF test box, configured to control a device under test (DUT) to transmit (TX) or receive (RX) an RF signal, comprising:
   an RF processing unit, configured to receive the RF signal transmitted from the DUT and down-convert the RF signal transmitted from the DUT into a baseband signal, or up-convert the baseband signal into an RF signal and transmit the RF signal to the DUT; and
   a low-level processer, configured to convert the baseband signal into a digital signal, or receive the digital signal and convert the digital signal into a baseband signal, and
   a cloud server, configured to store an algorithm corresponding to the predetermined wireless communication protocol, communicate with the remote RF test box through a communication interface, receive and decode the digital signal, and determine whether the DUT meets the predetermined wireless communication protocol through the algorithm of the predetermined wireless communication protocol;
   wherein the cloud server comprises:
   a storage device, configured to store the algorithm corresponding to the predetermined wireless communication protocol, wherein the algorithm of the predetermined wireless communication protocol comprises test patterns of the predetermined wireless communication protocol; and
   a high-level processor, configured to decode the digital signal and determine whether the DUT meets the predetermined wireless communication protocol through the test patterns of the predetermined wireless communication protocol.

2. The test device as claimed in claim 1, wherein the RF processing unit comprises:
   an RF front-end, configured to receive the RF signal transmitted from the DUT, or transmit the RF signal to the DUT; and
   an RF transceiver, configured to down-convert the RF signal transmitted from the DUT into a baseband signal, or up-convert the baseband signal into an RF signal.

3. The test device as claimed in claim 2, when the DUT is under a TX test, the RF front-end receives the RF signal transmitted from the DUT, the RF transceiver down-converts the RF signal into a baseband signal, and the low-level processer coverts the baseband signal to the digital signal and outputs to the cloud server.

4. The test device as claimed in claim 2, when the DUT is under an RX test, the RF front-end transmits the RF signal to the DUT, the low-level processor receives the digital signal retrieved by demodulating the RF signal by the DUT through a control signal line, and outputs the digital signal to the cloud server.

5. The test device as claimed in claim 1, wherein the cloud server further comprises a network unit, through which the test patterns of the other wireless communication protocol except the predetermined wireless communication protocol being input to the storage device of the cloud server through the network unit; and through which a test result of the DUT being output or the test patterns of the predetermined wireless communication protocol being output.

6. A test method suitable for a predetermined wireless communication protocol, performed by a remote RF test box and a cloud server, the test method comprising a TX (transmitting) test which comprises:
   controlling a DUT to transmit an RF signal;
   when the DUT transmits the RF signal, receiving the RF signal transmitted from the DUT, down-converting the RF signal into a baseband signal, converting the baseband signal into a digital signal, and then outputting the digital signal;
   receiving and decoding the digital signal; and
   determining whether the DUT meets the predetermined wireless communication protocol through an algorithm of the predetermined wireless communication protocol;
   the test method further comprising a RX (receiving) test which comprises:
   generating the digital signal of a test signal by the cloud server;
   receiving the digital signal, and converting the digital signal into a baseband signal;
   up-converting the baseband signal into an RF signal; and
   controlling the DUT to receive the RF signal, and the RF signal is demodulated by the DUT.

* * * * *